(12) United States Patent
Zhang

(10) Patent No.: US 11,306,648 B1
(45) Date of Patent: Apr. 19, 2022

(54) COMBUSTION PRE-CHAMBER FOR AN INTERNAL COMBUSTION ENGINE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/073,822

(22) Filed: Oct. 19, 2020

(51) Int. Cl.
| | | |
|---|---|---|
| *F02B 19/12* | (2006.01) | |
| *F02F 1/42* | (2006.01) | |
| *F02F 1/24* | (2006.01) | |
| *F02B 19/10* | (2006.01) | |
| *F02B 19/18* | (2006.01) | |
| *F02F 7/00* | (2006.01) | |

(52) U.S. Cl.
CPC .............. *F02B 19/12* (2013.01); *F02B 19/10* (2013.01); *F02B 19/18* (2013.01); *F02F 1/242* (2013.01); *F02F 1/4285* (2013.01); *F02F 7/0021* (2013.01); *F02F 2200/06* (2013.01)

(58) Field of Classification Search
CPC .......... F02B 19/12; F02B 19/10; F02B 19/18; F02F 1/242; F02F 1/4285; F02F 7/0021; F02F 2700/06
USPC ........................................................ 123/260
See application file for complete search history.

(56) References Cited

U.S. PATENT DOCUMENTS

| | | | | |
|---|---|---|---|---|
| 4,072,134 A | * | 2/1978 | Noguchi | F02B 19/1066 123/260 |
| 4,072,136 A | * | 2/1978 | Noguchi | F02B 19/1066 123/260 |
| 4,085,713 A | * | 4/1978 | Noguchi | F02B 19/1066 123/261 |
| 5,778,849 A | * | 7/1998 | Regueiro | F02F 1/242 123/254 |
| 10,196,963 B2 | | 2/2019 | Mori | |
| 10,337,397 B2 | | 7/2019 | Shelby et al. | |
| 2007/0089703 A1 | * | 4/2007 | Shiraishi | F02B 19/16 123/260 |
| 2020/0080466 A1 | | 3/2020 | Anderson et al. | |
| 2021/0003066 A1 | * | 1/2021 | Kraemer | F02B 19/18 |

FOREIGN PATENT DOCUMENTS

| | | |
|---|---|---|
| DE | 102017009235 A1 | 4/2019 |
| WO | 2020048775 A1 | 3/2020 |

* cited by examiner

*Primary Examiner* — Mahmoud Gimie
(74) *Attorney, Agent, or Firm* — Brooks Kushman P.C.; Geoffrey Brumbaugh

(57) ABSTRACT

An internal combustion engine has a cylinder head having a cylinder roof defining first and second intake ports. The cylinder head supports a spark plug positioned between a central axis of the cylinder roof and a fuel injector. A combustion pre-chamber is connected to and extends outwardly from the roof. The pre-chamber encapsulates the spark plug, and is offset from the central axis and positioned between the central axis and the first and second intake ports. The pre-chamber defines an inlet aperture and an outlet aperture positioned along a spray streamline of the fuel injector, and defines first and second side apertures. Each side aperture is positioned adjacent to a respective one of the first and second intake ports. A method of operating an engine having a pre-chamber is also provided.

20 Claims, 3 Drawing Sheets

COMBUSTION PRE-CHAMBER FOR AN INTERNAL COMBUSTION ENGINE

TECHNICAL FIELD

Various embodiments relate to an internal combustion engine with a combustion pre-chamber.

BACKGROUND

Internal combustion engines may be provided with a combustion pre-chamber positioned within the cylinder, with a two-stage combustion process from the pre-chamber and into the main combustion chamber of the cylinder.

SUMMARY

According to an embodiment, an internal combustion engine is provided with a cylinder head having a cylinder roof defining first and second intake ports. The cylinder head supports a spark plug positioned between a central axis of the cylinder roof and a fuel injector. The cylinder head has a combustion pre-chamber connected to and extends outwardly from the roof of the cylinder. The pre-chamber encapsulates the spark plug, and is offset from the central axis and positioned between the central axis and the first and second intake ports. The pre-chamber defines an inlet aperture and an outlet aperture positioned along a spray streamline of the fuel injector, and defines first and second side apertures. Each side aperture is positioned adjacent to a respective one of the first and second intake ports.

According to another embodiment, a method for operating an engine is provided. A fuel-air mixture is ignited within a combustion pre-chamber via a spark plug positioned inside a cavity defined by the combustion pre-chamber. The combustion pre-chamber is supported by and extends outwardly from a cylinder head of the engine and into a main combustion chamber of a cylinder. The combustion pre-chamber and spark plug are offset from a central axis of the cylinder. Exhaust gases are vented from within the combustion pre-chamber to the main combustion chamber via an inlet aperture, an outlet aperture, a first side aperture, and a second side aperture defined by the pre-chamber thereby igniting another fuel-air mixture within the main combustion chamber. Exhaust gases are purged from within the combustion pre-chamber via the outlet aperture into the main combustion chamber during an intake stroke by flowing intake air flow from first and second intake valves into the pre-chamber via the first and second side apertures.

DETAILED DESCRIPTION

As required, detailed embodiments of the present disclosure are provided herein; however, it is to be understood that the disclosed embodiments are merely examples, and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure and invention.

Figure 1:
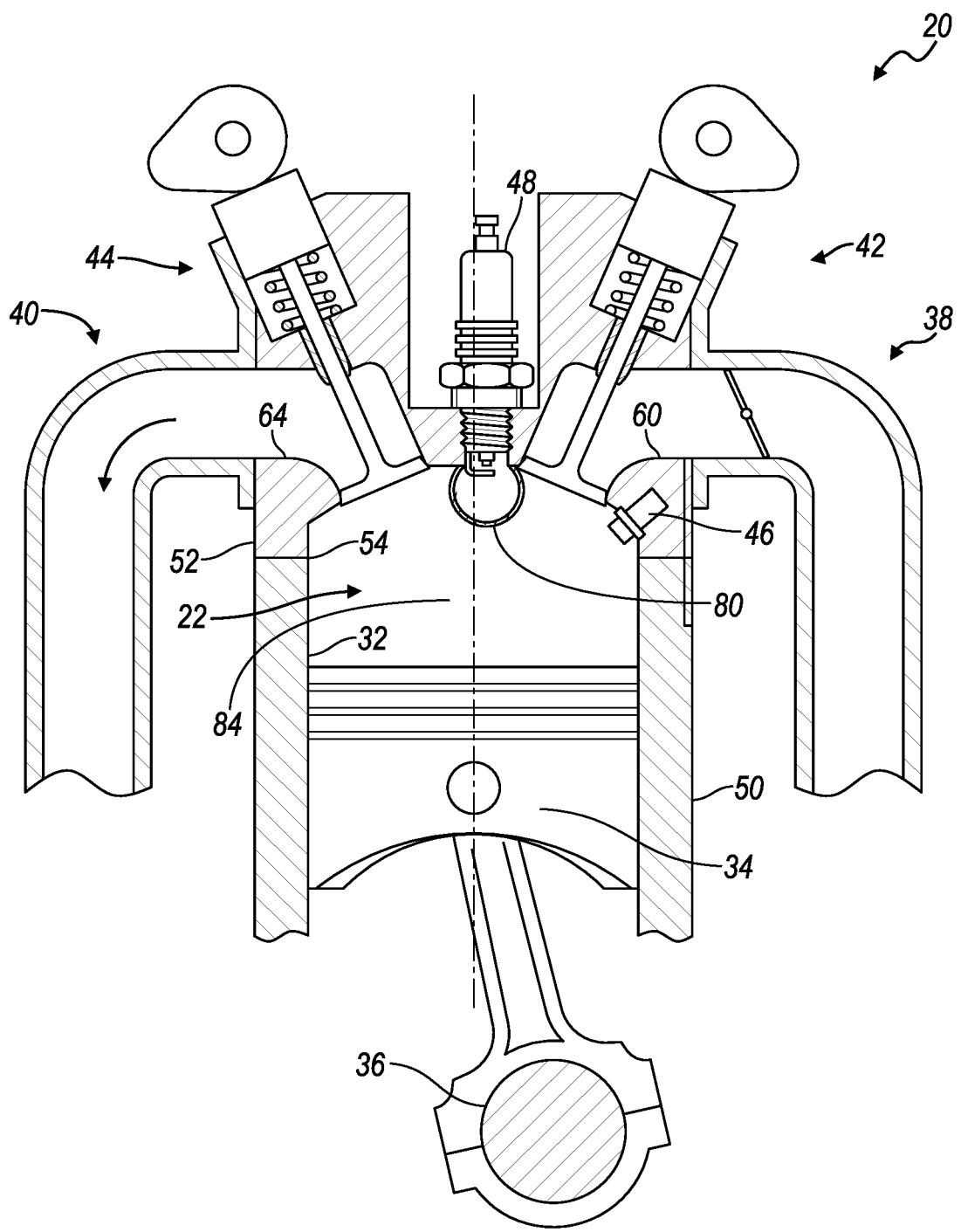
FIG. 1 illustrates a schematic of an internal combustion engine capable of implementing the disclosed embodiments.

FIG. 1 illustrates a schematic of an internal combustion engine 20. The engine 20 has a plurality of cylinders 22, and one cylinder is illustrated. The cylinder 22 is formed by cylinder walls 32 and piston 34. The piston 34 is connected to a crankshaft 36. The cylinder 22 is in fluid communication with the intake manifold 38 and the exhaust manifold 40. One or more intake valves 42 controls flow from the intake manifold 38 into the combustion chamber. One or more exhaust valves 44 controls flow from the combustion chamber to the exhaust manifold 40. The intake and exhaust valves 42, 44 may be operated in various ways as is known in the art to control the engine operation. The operation of the intake valve 42 and exhaust valve 44 are described in greater detail below.

A fuel injector 46 delivers fuel from a fuel system directly into the cylinder 22 such that the engine is a direct injection engine. A low pressure or high pressure fuel injection system may be used with the engine 20. An ignition system includes a spark plug 48 that is controlled to provide energy in the form of a spark to ignite a fuel air mixture in the combustion chamber. The spark plug 48 may be located in various positions within the cylinder 22.

The engine 20 includes a controller and various sensors configured to provide signals to the controller for use in controlling the air and fuel delivery to the engine, the ignition timing, valve timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two-stroke cycle. The piston 34 position at the top of the cylinder 22 is generally known as top dead center (TDC). The piston 34 position at the bottom of the cylinder is generally known as bottom dead center (BDC).

During the intake stroke, the intake valve(s) 42 opens and the exhaust valve(s) 44 closes while the piston 34 moves from the top of the cylinder 22 to the bottom of the cylinder 22 to introduce intake gases, e.g. air, from the intake manifold to the combustion chamber. Fuel may be introduced into the cylinder 22 while the piston 34 moves down during the intake stroke.

During the compression stroke, the intake and exhaust valves 42, 44 are closed. The piston 34 moves from the bottom towards the top of the cylinder 22 to compress the air/fuel mixture within the cylinder 22.

The compressed air/fuel mixture is then ignited within the cylinder 22. In the engine 20 shown, the fuel is injected into the cylinder 22 and is then ignited using spark plug 48. Fuel injection and ignition according to the present disclosure is described below in greater detail.

During the power stroke, also known as the expansion stroke, the ignited fuel-air mixture in the cylinder 22 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve(s) 42 remains closed, and the exhaust valve(s) 44 opens. The piston 34 moves from the bottom of the cylinder to the top of the cylinder 22 to remove the exhaust gases and combustion products from the cylinder 22 by reducing the volume of the cylinder 22. The exhaust gases flow from the cylinder 22 to the exhaust manifold 40 and to an aftertreatment system such as a catalytic converter.

The intake and exhaust valves 42, 44 positions and timing, as well as the fuel injection timing and ignition timing may be varied for the various engine strokes.

The engine 20 has an engine cylinder block 50 and a cylinder head 52. A head gasket 54 is interposed between the cylinder block 50 and the cylinder head 52 to seal the cylinders 22.

The cylinder head defines a roof 60. The roof 60 cooperates with the block 50 to define the cylinder 22.

The roof 60 of the cylinder head 52 defines at least one intake air port 62 that receives an associated intake valve 42. The intake air port 62 provides a passage for flow of intake air or intake gases from the intake manifold 38 to a respective cylinder 22. Intake air may include outside or environmental air, may include fuel mixed therein, and may also be mixed with exhaust gases from an exhaust gas recirculation system, etc.

The roof of the cylinder head 52 defines at least one exhaust gas port 64 that receives an associated exhaust valve 44. The exhaust gas port 64 provides a passage for flow of exhaust gases from each cylinder 22 to the exhaust manifold 40.

The intake port(s) 62 and exhaust port(s) 64 may be offset from the central axis 66. Likewise, the spark plug assembly 48 may be offset from the central axis 66, and in one example, may be adjacent to the intake port(s) 62 as further described below. The fuel injector 46 may likewise be offset from the central axis 66.

The engine 20 may be provided with a combustion pre-chamber 80. The combustion pre-chamber 80 may be used to increase combustion stability in the engine 20, for example, when used with an engine 20 having exhaust gas recirculation (EGR). EGR may be used to increase engine thermal efficiencies; however, EGR may reduce combustion stability in the engine 20, as well as result in increased levels of noise, vibration, and harshness (NVH). Conventionally, a combustion pre-chamber is provided in the center of the cylinder, such that there may be challenges in purging residual gases after a combustion event within the pre-chamber, e.g. purging exhaust gases or combustion byproducts from the combustion pre-chamber. When residual gases, combustion byproducts, or exhaust gases are insufficiently purged from a combustion pre-chamber, there may be associated challenges with the next ignition cycle or starting the next combustion event within the pre-chamber, e.g. a possible misfire event. These challenges may increase when using EGR, running the engine in a fuel lean state, or the like.

FIGS. 2-6 illustrate a combustion pre-chamber 80 according to the present disclosure. In one example, the combustion pre-chamber may be used with the engine 20 as described above. The combustion pre-chamber 80 provides for increased purging of the residual gases or exhaust gases within the pre-chamber. For simplicity, elements that are the same as or similar to those described above with respect to FIG. 1 are given the same reference number.

The pre-chamber 80 may be formed as a hollow body defining a cavity. The pre-chamber 80 is formed with a continuous side wall that extends outwardly from the roof 60 of the cylinder head, and a lower wall that is spaced apart from the roof. In one example, and as shown, the pre-chamber 80 may be formed with the side wall and lower wall blended together in a continuous curve. In a further example, the pre-chamber 80 may be formed with a continuous curved wall. The continuous curved wall may have a constant radius of curvature such that the pre-chamber 80 is formed as a section or portion of a sphere. For example, the pre-chamber 80 may be formed as a spherical dome from a majority section of a sphere as shown schematically in FIG. 3. According to one non-limiting example, the pre-chamber 80 is formed as a spherical dome from between 60-85% of a sphere, or between 60-75% of a sphere. In another example, the continuous curved wall has a varying radius of curvature.

The pre-chamber 80 defines a cavity 82 therein, such that the volume of the cylinder 22 is divided into the pre-chamber 80 and a main combustion chamber 84. The main combustion chamber is the region of the cylinder 22 that is outside the pre-chamber 80.

The spark plug assembly 48 is offset from the central axis 66 of the cylinder, and is positioned in a region of the cylinder roof 60 that is between the central axis 66 and the first and second intake ports 62. The spark plug assembly 48 is positioned between the fuel injector 46 and the central axis 66. The fuel injector 46 is therefore also offset from the central axis 66, and may be positioned within the cylinder 22 such that it is adjacent to the intake ports 62, and spaced apart from the exhaust ports 64.

The pre-chamber 80 is connected to the roof 60 of the cylinder head such that the spark plug assembly 48 is received within the cavity 82 defined by the pre-chamber 80. The pre-chamber 80 may encapsulate the spark plug assembly 48. The pre-chamber 80 is therefore offset from the central axis 66, and is positioned between the first and second intake ports 62, and is positioned between the central axis 66 and the first and second intake ports 62 as shown in FIG. 2.

Figure 2:
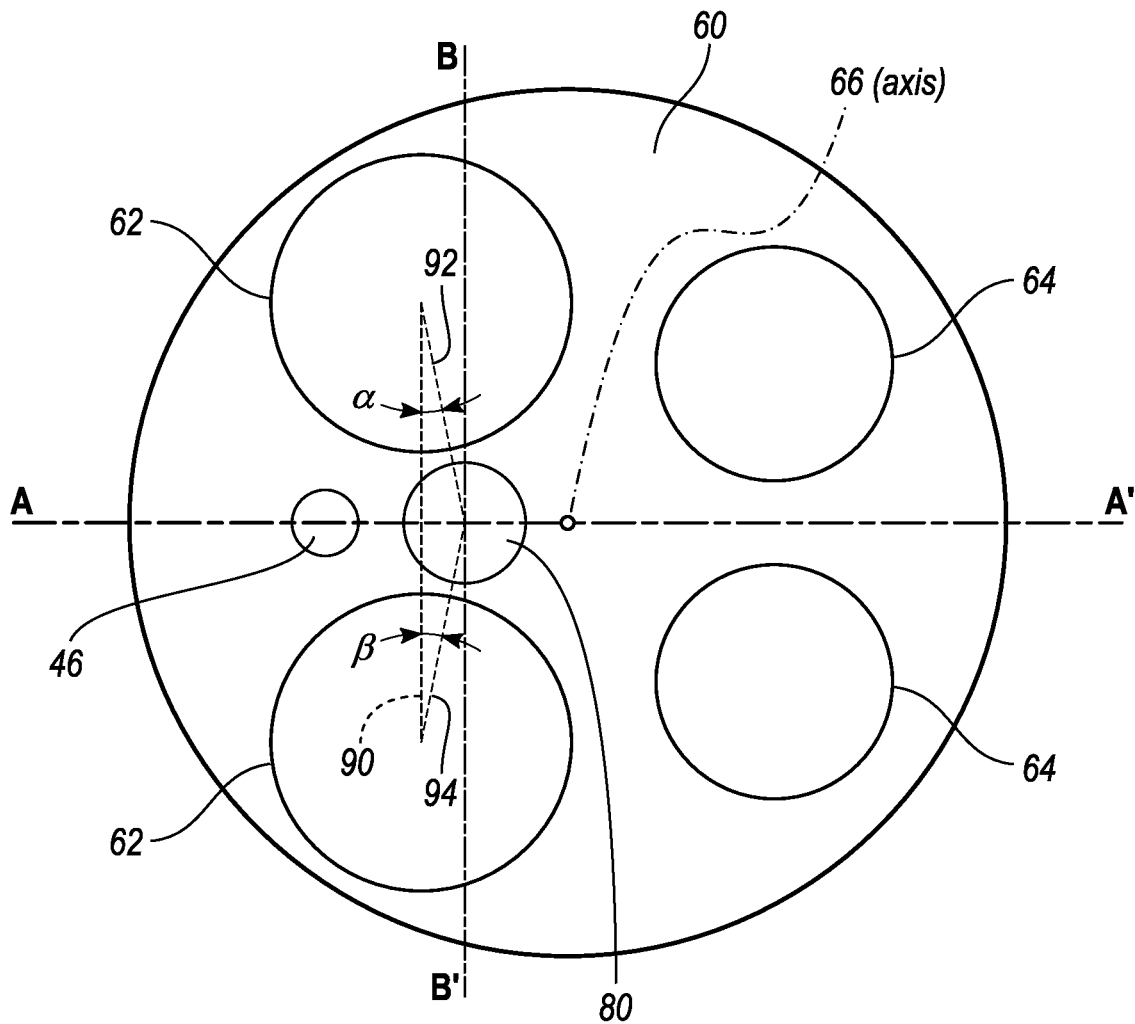
FIG. 2 illustrates a schematic view of a combustion pre-chamber and a roof of a cylinder head according to an embodiment.

According to one example, and as shown in FIG. 2, the combustion pre-chamber 80 is positioned between the central axis 66 of the cylinder and a first line 90 extending through the center axes of both intake valves 42 or centers of the intake ports 60.

In a further example, and as shown, the combustion pre-chamber 80 is positioned such that an acute angle α is formed between the first line 90 and a second line 92 extending through the center axis of the first intake valve 42 or intake port 60 and the central axis 66 of the combustion pre-chamber. The combustion pre-chamber 80 is also positioned such that an acute angle β is formed between the first line 90 and a third line 94 extending through the center axis of the second intake valve 42 or intake port 62 and the central axis 66 of the combustion pre-chamber. Each of the acute angles α, β may be in the range of 15-20 degrees, although other acute angle ranges are also contemplated. Furthermore, and in some examples, the two acute angles α, β may be the same as one another.

The pre-chamber 80 defines an inlet aperture 100 and an outlet aperture 102. The inlet aperture 100 and the outlet aperture 102 may be opposite to one another on the pre-chamber 80. The inlet aperture 100 and outlet aperture 102 may be positioned along a spray streamline 104 of the fuel injector 46, with the inlet aperture 100 positioned between the fuel injector 46 and the outlet aperture 102. The outlet aperture 102 may be positioned to face the central axis 66, or may be positioned to face generally towards the first and second exhaust ports 64, or the region of the roof defining the first and second exhaust ports 64. Note that the fuel injector 46 may have multiple spray streamlines, with only the spray streamline 104 directed to the pre-chamber 80 being shown. The remaining spray streamlines may direct fuel into the main combustion chamber 84 during an injection event.

The pre-chamber 80 also defines a first side aperture 106 and a second side aperture 108. In the example shown, the pre-chamber 80 has only one first side aperture 106 and only one second side aperture 108, such that the pre-chamber 80 has only four apertures 100, 102, 106, 108 in total when it is assembled to the engine 20. In other examples, the pre-chamber 80 may have two or more first side apertures 106 and two or more second side apertures 108.

The first side aperture 106 is positioned adjacent to the first intake port 62, and the second side aperture 108 is positioned adjacent to the second intake port 62. The spray streamline 104 from the fuel injector therefore extends through the pre-chamber 80 and between the first and second side apertures 106, 108.

According to one example, the cross-sectional area of the outlet aperture 102 may be greater than a cross-sectional area of the inlet aperture 100. Furthermore, the cross-sectional area of the outlet aperture 102 may be greater than a cross-sectional area of the first side aperture 106 and greater than a cross-sectional area of the second side aperture 108. The cross-sectional area of the inlet aperture 100 may be less than a cross-sectional area of the first side aperture 106 and also less than a cross-sectional area of the second side aperture 108. The first and second side apertures 106, 108 may each have the same cross-sectional area as one another. According to one non-limiting example, the inlet aperture 100 has a cross-sectional area of 1.2 mm$^2$, the first and second side apertures 106, 108 each have a cross-sectional area of 1.8 mm$^2$, and the outlet aperture 102 has a cross-sectional area of 3 mm$^2$.

Figure 3:
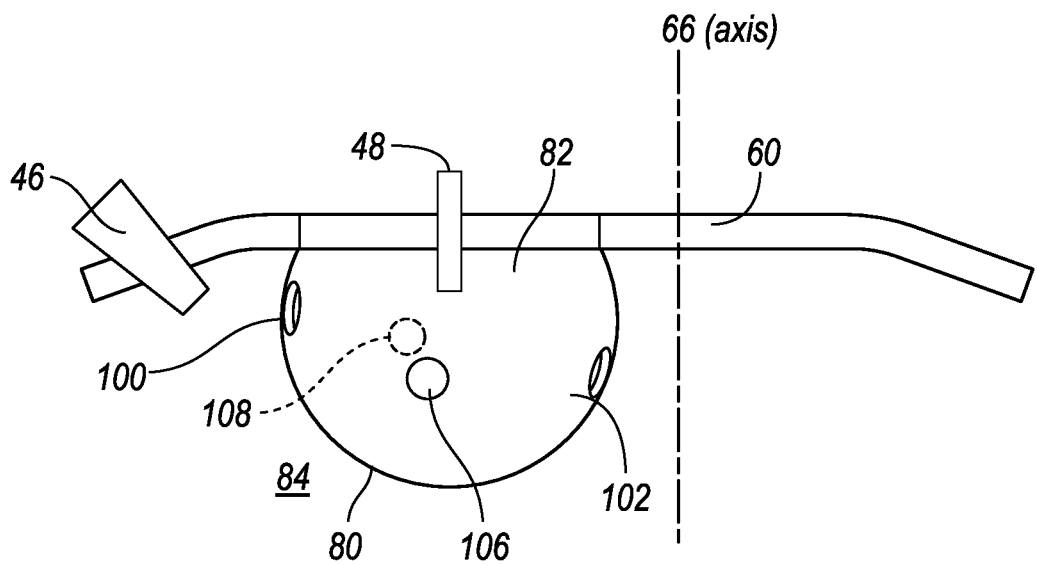
FIG. 3 illustrates a side schematic view of the combustion pre-chamber of FIG. 2.
Figure 4:
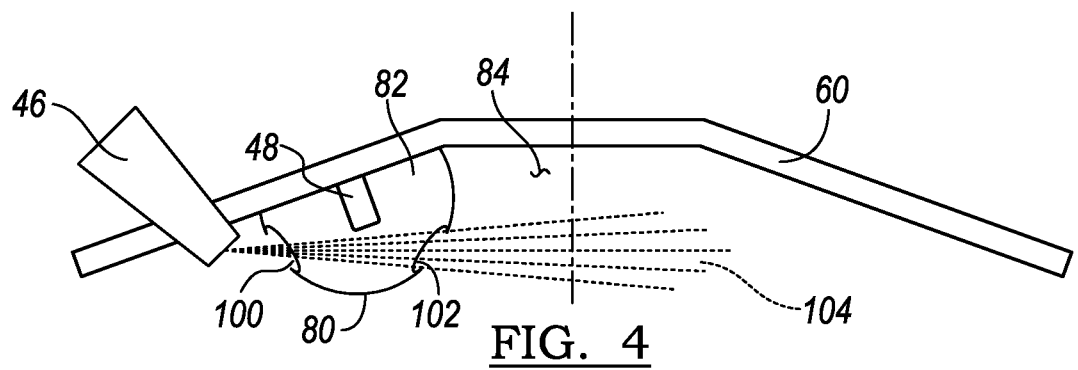
FIG. 4 illustrates a schematic view of the combustion pre-chamber and roof of FIG. 2 taken along the A-A section line during an injection process.

A centerline of the fuel injector 46 may be oriented at an acute angle relative to the central axis 66 of the cylinder, as shown in FIGS. 3 and 4. In use, a spray 104 of fuel from the fuel injector 46 is directed towards the pre-chamber 80, and this spray 104 of fuel enters the pre-chamber via the inlet aperture 100. The remainder of fuel injected by the fuel injector 46 is directed into the main combustion chamber 84. The inlet aperture 100 is therefore aligned or generally aligned with the spray 104 streamline from the fuel injector.

The inlet aperture 100 therefore receives a spray 104 of fuel with a first portion of fuel from the fuel injector 46 during a fuel injection process.

A second portion of fuel from the spray 104 of fuel exits the pre-chamber 80 via the outlet aperture 102 during the fuel injection process, with the second portion being less than the first portion. The spray 104 of fuel therefore has some fuel that passes through the pre-chamber 80 and back into the main chamber 84. A remainder of the fuel remains in the cavity 82 of the pre-chamber 80, and this amount may be equivalent to the first portion of fuel minus the second portion of fuel in the spray 104. In one example, only 3-5% by volume of the total fuel injected into the pre-chamber 80 remains in the pre-chamber 80 after the injection process and prior to an ignition event.

Figure 5:
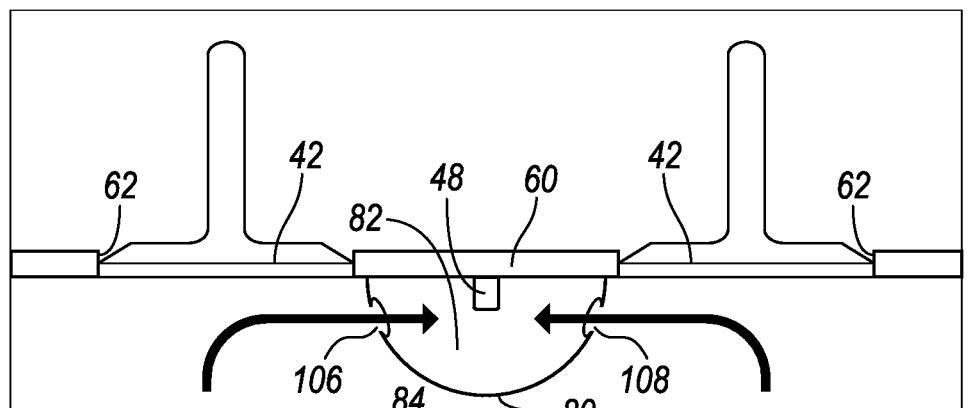
FIG. 5 illustrates a schematic view of the combustion pre-chamber and roof of FIG. 2 taken along the B-B section line during the injection process of FIG. 4.

The high velocity of the spray 104 across the pre-chamber 80, e.g. from the inlet aperture 100 to the outlet aperture 102, creates a vacuum of low pressure region within the pre-chamber 80 compared to the main chamber 84. The local pressure within the pre-chamber 80 is therefore less than the local pressure in the main combustion chamber 84. As such, the spray 104 of fuel may push residual gases out of the pre-chamber 80 via the outlet aperture 102. Furthermore, the low pressure created in the pre-chamber 80 by the spray 104 of fuel therethrough causes intake air or gases within the main combustion chamber 84 to flow into the pre-chamber 80 via the first and second side apertures 106, 108. The injection process and spray 104 of fuel across and through the pre-chamber 80 therefore acts as a first purging process for the pre-chamber 80 to clear residual gases from the pre-chamber. FIG. 4 illustrates the injection process with a spray 104 of fuel through the pre-chamber 80, and FIG. 5 illustrates intake air or gas in the main chamber 84 being drawn into the pre-chamber 80 via the side apertures 106, 108.

The spark plug assembly 48 may then be activated or sparked to ignite the fuel-air mixture within the pre-chamber 80. As the end of the spark plug assembly 48 is located within the pre-chamber 80, the fuel-air mixture within the pre-chamber 80 ignites prior to any combustion event in the main combustion chamber 84.

The fuel-air charge in the pre-chamber 80 is ignited by the spark plug assembly 48 and the flame propagates across and within the cavity 82 of the pre-chamber 80. With the combustion event in the pre-chamber 80, hot exhaust gases or combustion byproduct gases in the pre-chamber 80 vent or exit out of the pre-chamber 80 and into the main combustion chamber 84 via the inlet aperture 100, outlet aperture 102, and side apertures 106, 108 to ignite the fuel-air charge in the main combustion chamber 84. The positioning of the apertures 100, 102, 106, 108 directs the hot exhaust gases into different regions of the main combustion chamber 84 in the cylinder to provide multiple ignition points of the fuel-air charge in the main combustion chamber 84.

The pre-chamber 80 therefore provides for a two-stage combustion process within the cylinder 22. The first stage is provided by the spark plug 48 ignition and a combustion event in the pre-chamber 80. The second stage is provided by ignition in the main chamber 84 caused by the exhaust gases from the pre-chamber 80 flowing into and igniting the fuel-air mixture in the main chamber 84.

The outlet aperture 102 may have a larger cross-sectional area than the inlet aperture 100 both to allow for and control the exit of a portion of the fuel spray 104 from the pre-chamber, as well as to direct a larger proportion of hot exhaust gases from the pre-chamber 80, towards the exhaust port 64 side of the cylinder 22 based on the offset location of the pre-chamber 80 in the cylinder. The larger outlet aperture 102 cross-sectional area therefore provides for a control over the flow of hot exhaust gases from the pre-chamber 80 into the main combustion chamber 84, and improved ignition of the fuel-air charge in the main combustion chamber 84 in the exhaust port 64 region of the main combustion chamber 84 and cylinder.

The cross-sectional areas of the inlet aperture 100, outlet aperture 102, and side apertures 106, 108 may be therefore sized to control the flow of hot exhaust gases from the pre-chamber 80 into the main combustion chamber 84. The smaller the cross-sectional area, the lower the penetration distance for the flow of exhaust gases from the pre-chamber 80 into the main combustion chamber 84. The cross-section areas of the pre-chamber apertures 100, 102, 106, 108 may therefore be a function of the distance to the cylinder 22 wall that the respective aperture faces, with the cross-sectional area increasing in size with increased distance to the cylinder 22 side wall.

Figure 6:
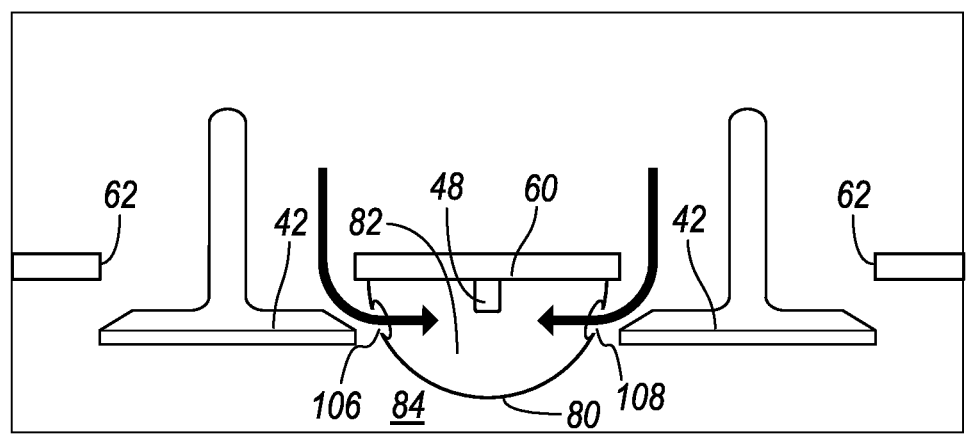
FIG. 6 illustrates a schematic view of the combustion pre-chamber and roof of FIG. 2 taken along the B-B section line during an intake stroke and with the intake valves opened.

The pre-chamber 80 is further purged during the intake stroke and with the intake valves 42 opened, as shown in FIG. 6. During the intake stroke, the piston moves down and away from the cylinder head, which creates a vacuum or low pressure within the cylinder 22 and draws intake air into the cylinder via the intake ports 62 and opened intake valves 42. Note that intake air may include exhaust gases recirculated from the engine exhaust (EGR) as well as outside air. During the intake stroke and based on the low pressure in the main combustion chamber 84 due to the movement of the piston, residual gases or combustion byproducts are drawn out of the pre-chamber 80 via the outlet aperture 102, and intake air is drawn into the pre-chamber 80 from the intake ports 62 via the first and second side apertures 106, 108 as shown in FIG. 6.

The first and second side apertures 106, 108 are positioned adjacent to the first and second intake ports 62 to aid in the flow of intake air into the pre-chamber 80. In further examples, the first and second side apertures 106, 108 may be positioned between the roof 60 of the cylinder and the bottom or face of the associated intake valve 42 with the intake valve 42 in a fully open position, as shown in FIG. 6. This intermediate position for the side apertures 106, 108 may aid the flow of intake air from the intake ports 62 into the pre-chamber 80 as well as purge combustion byproducts from the prior combustion cycle from the pre-chamber 80 during the intake stroke.

The pre-chamber 80 according to the present disclosure therefore provides for control over an amount of fuel within the pre-chamber 80 at an ignition event, and also allows for a multi-stage purge process of the pre-chamber 80 to remove combusted residual gases from the pre-chamber 80 and provide a charge of intake air into the pre-chamber 80 prior to a subsequent ignition event. This may result in a more robust and stable combustion event for the engine 20, and may be used with engines that are being operated at a high dilution or fuel lean condition, or with EGR.

According to various embodiments, a method for operating an engine is provided. The engine may be the engine 20 as described above. Elements that are the same as or similar to those described above are given the same reference number for simplicity.

An engine 20 is provided and has a cylinder head 52 with a pre-chamber 80. In one example, the cylinder head 52 and pre-chamber 80 are formed together as an integral component during a casting process. In another example, the cylinder head 52 and pre-chamber 80 may be formed as separate components, with the pre-chamber machined to the desired size and shape and then attached to the roof 60 of the cylinder via a welding process, via fasteners, or the like.

The pre-chamber 80 may be formed with or may have apertures 100, 102, 106, 108 machined through it. The pre-chamber 80 may be formed with an inlet aperture 100, an outlet aperture 102, and first and second side apertures 106, 108. The first and second side apertures 106, 108 may be positioned between a roof 60 of the cylinder and a face of the first intake valve 42 when the first intake valve is in a fully open position.

Fuel is injected into the cylinder 22 using a fuel injector 46. A spray 104 of fuel from the fuel injector is received by the pre-chamber 80 via the inlet aperture 100.

Exhaust gases or residual gases are purged in a first purging stage from the pre-chamber 80 while injecting fuel into the cylinder 22. During a compression stroke and/or during the injection process, a portion of the spray 104 of fuel flows out of the pre-chamber 80 via the outlet aperture 102 and thereby pushes residual gases out of the pre-chamber 80 via the outlet aperture 102 while drawing air from the main combustion chamber 84 into the pre-chamber 80 via the first and second side apertures 106, 108.

A fuel-air mixture is ignited within the combustion pre-chamber 80 via a spark plug 48 positioned inside a cavity 82 defined by the combustion pre-chamber 80 for a first combustion stage. The combustion pre-chamber 80 is supported by and extends outwardly from the cylinder head 52 of the engine and into the main combustion chamber 84 of a cylinder. The combustion pre-chamber 80 and spark plug 48 are offset from a central axis 66 of the cylinder.

Exhaust gases are vented from within the combustion pre-chamber 80 into the main combustion chamber 84 via the inlet aperture 100, outlet aperture 102, and first and second side apertures 106, 108 thereby igniting another fuel-air mixture within the main combustion chamber 84 for a second combustion stage.

Exhaust gases or residual gases are further purged out of the combustion pre-chamber 80 and into the main combustion chamber 84 via the outlet aperture 102 during an intake stroke. During the intake stroke and with the intake valves 42 opened, residual gases are drawn out of the pre-chamber 80 via the outlet aperture 102, and intake air flows from the first and second intake ports 62, through the first and second side apertures 106, 108, and into the pre-chamber 80.

While exemplary embodiments are described above, it is not intended that these embodiments describe all possible forms of the disclosure or invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. An internal combustion engine comprising:
a cylinder head having a cylinder roof defining first and second intake ports, and supporting a spark plug positioned between a central axis of the cylinder roof and a fuel injector, the cylinder head having a combustion pre-chamber extending outwardly from the roof, the pre-chamber encapsulating the spark plug, the pre-chamber offset from the central axis and positioned between the central axis and the first and second intake ports, the pre-chamber defining an inlet aperture and an outlet aperture positioned along a spray streamline of the fuel injector, and defining first and second side apertures, each side aperture positioned adjacent to a respective one of the first and second intake ports.

2. The engine of claim 1 wherein the spray streamline extends between the first and second side apertures.

3. The engine of claim 1 wherein the outlet aperture is positioned to face towards first and second exhaust ports defined by the cylinder roof.

4. The engine of claim 1 wherein a cross-sectional area of the outlet aperture is greater than a cross-sectional area of the first side aperture and greater than a cross-sectional area of the second side aperture.

5. The engine of claim 4 wherein a cross-sectional area of the outlet aperture is greater than a cross-sectional area of the first side aperture, and wherein the cross-sectional area of the first side aperture is greater than a cross-sectional area of the inlet aperture.

6. The engine of claim 1 wherein the fuel injector is oriented at an acute angle relative to the central axis.

7. The engine of claim 1 wherein the combustion pre-chamber is formed as a spherical dome from a majority section of a sphere.

8. The engine of claim 1 wherein the inlet aperture is positioned to receive a first portion of fuel from the fuel injector into the pre-chamber during a fuel injection, and wherein a second portion of fuel from the fuel injector exits the pre-chamber via the outlet aperture during the fuel injection, the second portion being less than the first portion.

9. The engine of claim 1 wherein the combustion pre-chamber is positioned between the central axis and a first line extending through first and second centers of the first and second intake ports, respectively.

10. The engine of claim 9 wherein the combustion pre-chamber is positioned such that an acute angle is formed between the first line and a second line extending through the first center of the first intake port and a center of the combustion pre-chamber.

11. The engine of claim 10 wherein the acute angle is between sixty and seventy-five degrees.

12. The engine of claim 1 further comprising a cylinder block defining a cylinder sized to receive a piston, the cylinder block cooperating with the cylinder head such that the cylinder and cylinder roof cooperate to define a main combustion chamber.

13. An internal combustion engine comprising:
a cylinder head having a cylinder roof defining first and second intake ports, and supporting a spark plug positioned between a central axis of the cylinder roof and a fuel injector, the cylinder head having a combustion pre-chamber extending outwardly from the roof, the pre-chamber encapsulating the spark plug, the pre-chamber offset from the central axis and positioned between the central axis and the first and second intake ports, the pre-chamber defining an inlet aperture and an outlet aperture positioned along a spray streamline of the fuel injector, and defining first and second side apertures, each side aperture positioned adjacent to a respective one of the first and second intake ports;
wherein a cross-sectional area of the outlet aperture is greater than a cross-sectional area of the inlet aperture.

14. A method for operating an engine, the method comprising:
igniting a fuel-air mixture within a combustion pre-chamber via a spark plug positioned inside a cavity defined by the combustion pre-chamber, the combustion pre-chamber supported by and extending outwardly from a cylinder head of the engine and into a main combustion chamber of a cylinder, the combustion pre-chamber and spark plug being offset from a central axis of the cylinder, with the pre-chamber positioned between the central axis, the first intake valve, and the second intake valve;
venting exhaust gases from within the combustion pre-chamber to the main combustion chamber via an inlet aperture, an outlet aperture, a first side aperture, and a second side aperture defined by the pre-chamber thereby igniting another fuel-air mixture within the main combustion chamber; and
purging exhaust gases from within the combustion pre-chamber via the outlet aperture into the main combustion chamber during an intake stroke by flowing intake air flow from first and second intake valves into the pre-chamber via the first and second side apertures.

15. The method of claim 14 further comprising injecting fuel using a fuel injector, wherein a spray of fuel from the fuel injector is received by the pre-chamber via the inlet aperture, and wherein the spark plug is positioned between the central axis and the fuel injector.

16. The method of claim 15 further comprising purging exhaust gases from the pre-chamber while injecting fuel, wherein a portion of the spray of fuel flows out of the pre-chamber via the outlet aperture thereby drawing air from the main combustion chamber into the pre-chamber via the first and second side apertures during a compression stroke.

17. The method of claim 14 further comprising forming the first and second side apertures in the pre-chamber such that the first and second side apertures are positioned between a roof of the cylinder and a face of the first intake valve when the first intake valve is in a fully open position.

18. The method of claim 14 wherein the combustion pre-chamber is formed by a machining process, and wherein the machined combustion pre-chamber is connected to the cylinder head via welding.

19. The method of claim 14 wherein the combustion pre-chamber is integrally formed with the cylinder head during a casting process.

20. The method of claim 14 wherein the cross-sectional area of the outlet aperture is greater than at least one of a cross-sectional area of the inlet aperture and a cross-sectional area of the first side aperture.

* * * * *